(12) United States Patent
Tachikawa et al.

(10) Patent No.: US 8,763,304 B2
(45) Date of Patent: Jul. 1, 2014

(54) METHOD FOR PRODUCING ROOTED CUTTING OF PINACEAE TREE

(75) Inventors: Hiroshi Tachikawa, Tokyo (JP); Chikahiro Miyake, Kyoto (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 515 days.

(21) Appl. No.: 12/664,273

(22) PCT Filed: Jun. 10, 2008

(86) PCT No.: PCT/JP2008/060622
§ 371 (c)(1),
(2), (4) Date: Mar. 29, 2010

(87) PCT Pub. No.: WO2008/153031
PCT Pub. Date: Dec. 18, 2008

(65) Prior Publication Data
US 2010/0180498 A1   Jul. 22, 2010

(30) Foreign Application Priority Data

Jun. 13, 2007  (JP) ................................. 2007-155859

(51) Int. Cl.
*A01G 7/00*    (2006.01)
*A01G 7/02*    (2006.01)

(52) U.S. Cl.
USPC .................................. 47/58.1 R; 47/58.1 SE

(58) Field of Classification Search
USPC .......... 47/58.1 R, 58.1 SC, 58.1 SE, 59 R, 60
See application file for complete search history.

(56) References Cited

U.S. PATENT DOCUMENTS

| 4,338,745 | A  | * | 7/1982  | Misawa et al.     | 47/58.1 R |
| 4,353,184 | A  | * | 10/1982 | Abo El-Nil        | 435/422   |
| 4,550,528 | A  | * | 11/1985 | Mehra-Palta et al.| 47/58.1 R |
| 5,058,318 | A  | * | 10/1991 | Tammen            | 47/58.1 R |
| 6,481,154 | B1 | * | 11/2002 | Nakamura et al.   | 47/1.01 R |
| 6,897,065 | B1 | * | 5/2005  | Find              | 435/422   |
| 7,795,029 | B2 | * | 9/2010  | Fan et al.        | 435/422   |
| 2006/0088935 | A1 | * | 4/2006 | Fan et al.        | 435/422   |

FOREIGN PATENT DOCUMENTS

| AU | 2000 72547 B2 | 7/2001  |
| JP | 55 108214     | 8/1980  |
| JP | 9 294462      | 11/1997 |
| JP | 2001 186814   | 7/2001  |

OTHER PUBLICATIONS

Nozawa Akio et al., "Matsukuimushi ni Tsuyoi Matsubayashi Zosei Hoho no Kenkyu", Tochigi-Ken Ringyo Center Nenpo, No. 35, p. 5, (2004).

(Continued)

*Primary Examiner* — David Parsley
(74) *Attorney, Agent, or Firm* — Oblon, Spivak, McClelland, Maier & Neustadt, L.L.P.

(57) ABSTRACT

A method for producing a rooted cutting which can be applied to Pinaceae trees. Specifically, the present invention provides a method for producing a rooted cutting of a Pinaceae tree, comprising the following steps A and B:
 A: adding a cytokinin to the outside of a shoot apex of a short shoot of a Pinaceae tree to thereby induce a new scaly leaf and/or primary leaf; and B: cutting out the short shoot where new scaly leaf and/or primary leaf is induced in the step A, inserting the short shoot as a cutting in a rooting bed wetted with a carbon source-free liquid medium comprising nitrogen, phosphorus and potassium as essential elements, and culturing the short shoot in a culturing vessel while regulating the concentration of $CO_2$ gas in the culturing vessel at a humidity of 80% or more to root the cutting.

18 Claims, 3 Drawing Sheets

(56) References Cited

OTHER PUBLICATIONS

Miyahara Fumihiko et al., "Kuromatsu no Hogashi Hassei ni Oyobosu BAP Shori Jiki Narabini Sentei Jiki no Eikyo", Kyushu Shinrin Kenkyu, No. 59, pp. 234 to 236, (2006).

Chilean Office Action issued Dec. 6, 2008, in Patent Application No. 1730-08 (with English-language translation).

Office Action issued Jan. 3, 2012, in Australian Patent Application No. 2008262990.

* cited by examiner

METHOD FOR PRODUCING ROOTED CUTTING OF PINACEAE TREE

TECHNICAL FIELD

The present invention relates to a technique for mass-producing rooted cuttings of *Pinaceae* trees in a commercial scale by means of cutting.

BACKGROUND ART

A *Pinaceae* tree is one of tree types which have been the most widely planted in the world. In Japan, *Pinaceae* trees are utilized in industry and forests of *Pinus densiflora* in undeveloped natural woodlands, forests of *Pinus thunbergii* along seashores and the like take root as a landscape representing Japan.

Although they are trees which have been widely planted, grafting is a mainstream as a nutritive growing method for pine and no cutting has been generally adopted.

In the production of *Pinaceae* trees by grafting, there is known a method where a cytokinin which is one of plant growth regulators having an action of promoting a cell division and formation of a shoot is used to thereby effectively collect explanted plants. Thus, as shown in FIG. 1, *Pinaceae* trees have short branches of 2 to 3 cm length called short shoots at the root of needle leaves, the top of the short leaf has a shoot apex which is a base of buds at the area corresponding to the basement of needle leaf and, usually, although the shoot apex of the short shoot is in a state of dormancy, the cytokinin is made to act thereon in the above method whereby a shoot is induced from the shoot apex of the short shoot and utilized as a shooting (Non-Patent Document 1).

On the other hand, in a method for producing pine trees by cutting, various investigations have been conducted using a current branch which is said to be usually suitable for cutting, but no method for producing a rooted cutting which can be carried out in a practical scale has been known yet. Main reasons therefor would be the following three.

Reasons 1: As the age of *Pinaceae* trees elapses, the rooting rate is significantly decreased even in the case of a cutting obtained from the current branch.

Reason 2: In the case of a cutting prepared from the current branch of a young tree, although a rooting rate to some extent is expected, numbers of the current branch are small due to the small tree body and sufficient numbers of cuttings cannot be collected.

For example, in ramifications of *P. densiflora* and *P. thunbergii* which are *Pinaceae* trees, only about five lateral buds grow in an axial manner around the new bud once a year in a natural state and, therefore, numbers of the current branches which can be collected as cuttings are limited and, in the case of trees of as young as 3 to 5 years, cuttings can be collected in small numbers of about 20 to 40.

Reason 3: Even when the current branches of young trees are used as cuttings, it is still necessary that a period as long as 3 to 6 months is required until root striking.

Accordingly, although there are *Pinaceae* trees in Japan having useful characters such as resistance against pine wilt which are running rampant in Japan, no effective production method by means of cutting has been developed whereby supply of pine seedlings has to rely merely upon grafting seedling or actual seedling derived from seeds. However, in a method for producing the seedlings by means of grafting, working steps are complicated and skillfulness is needed while, in the case of actual seedlings, it is not always possible that the good characters of the parents are delivered. Thus, it is difficult to mass-produce seedlings of uniform quality equipped with the above useful characters at a time in a practical scale.

The present applicant has already reported a method for producing a rooted cutting utilizing a photoautotrophically culturing method as a method for producing a rooted cutting of a hardly rooting tree (Patent Document 1), but, even by such a method, it is still difficult to produce cutting of *Pinaceae* trees in a practical scale.

Patent Document 1: JP-A-2001-186814

Non-Patent Document 1: Wakushima and Yoshioka, "Studies on Growth of *Pinus densiflora* Resistant to Pine Wood Nematode—Influence of Period and Frequency of Treatment with Spraying of BAP", Hiroshima-ken Ringyo Shikenjo Research Report, vol. 27, pages 95 to 100 (1993)

DISCLOSURE OF THE INVENTION

Problems to be solved by the invention

The present invention has been conducted under the above circumstances as a background and its object is to provide a method for producing a rooted cutting which can be applied to *Pinaceae* trees which have been considered to be difficult to grow by means of cutting.

Another object of the present invention is to provide a method for producing rooted cuttings in an amount of a practical scale in *Pinaceae* trees, that is, rooted cuttings in an amount which can be used for afforestation and tree planting at a time.

Means for Solving the Problems

As a result of intensive studies, the present inventors have found that the above objects can be achieved by photoautotrophically culturing a short shoot of a *Pinaceae* tree to which a scaly leaf and/or primary leaf is induced by adding a cytokinin to the outside thereof and thus the present invention has been achieved.

Thus, the present invention relates to the following (1) to (4).

(1) A method for producing a rooted cutting of a *Pinaceae* tree, comprising the following steps A and B.

A: adding a cytokinin to the outside of a shoot apex of a short shoot of a *Pinaceae* tree to thereby induce a new scaly leaf and/or primary leaf;

B: cutting out the short shoot in which the new scaly leaf and/or primary leaf is induced in the step A, and inserting the short shoot as a cutting in a rooting bed wetted with a carbon source-free liquid medium comprising nitrogen, phosphorus and potassium as essential elements, followed by culturing in a culturing vessel while regulating the concentration of $CO_2$ gas in the culturing vessel at a humidity of 80% or more to thereby root the cutting.

(2) The method according to (1), wherein the step A and/or the step B is carried out under non-sterile conditions.

(3) The method according to (1) or (2), wherein the step B is carried out while regulating the concentration of $CO_2$ gas in the culturing vessel to 300 to 1,500 ppm.

(4) The method according to any one of (1) to (3), wherein the *Pinaceae* tree is a tree belonging to the genus *Pinus*.

Effect of the Invention

In accordance with the invention as described in the above (1), a short shoot of a *Pinaceae* tree to which a new scaly lead and/or primary leaf is inducted by adding a cytokinin to the outside thereof is used as a cutting and, therefore cuttings can be collected in large quantities even from young trees in a small size. Furthermore, the resulting cuttings thus obtained are cultured in a culturing vessel under high humidity conditions while providing nutrients necessary for the growth of plants and regulating the concentration of $CO_2$ gas and, therefore, in *Pinaceae* trees which have been considered to be difficult in rooting, rooting from the cuttings is promoted and the rooting rate is greatly improved. Consequently, in accordance with the invention as described in the above (1), there are provided not only a method for producing a rooted cutting which can be applied to *Pinaceae* trees which have been considered to be difficult to grow by means of cutting but also a method for producing rooted cuttings in an amount of a practical scale in *Pinaceae* trees, that is, rooted cuttings in an amount which can be used for afforestation and tree planting at a time.

In accordance with the invention as described in the above (2), neither sterile equipment nor operation for sterilization is necessary for carrying out the invention and, therefore, a method for producing rooted cuttings of *Pinaceae* trees at lower cost and in easier manner can be provided.

In accordance with the invention as described in the above (3), the concentration of $CO_2$ gas in the culturing vessel can be kept within a range which is optimum for photoautotrophically culturing, rooting from the cuttings can be more surely promoted and the rooting rate thereof is greatly improved and, therefore, a method for producing rooted cuttings of *Pinaceae* trees which is more appropriate for the mass-production of rooted cuttings can be provided.

In accordance with the invention as described in the above (4), since *Pinus densiflora, P. thunbergii* and the like which are representative of *Pinaceae* trees in Japan belong to the genus *Pinus* of *Pinaceae* trees, a method for producing rooted cuttings of a *Pinaceae* tree which can be expected to have a greater contribution to the society can be provided.

Figure 1:
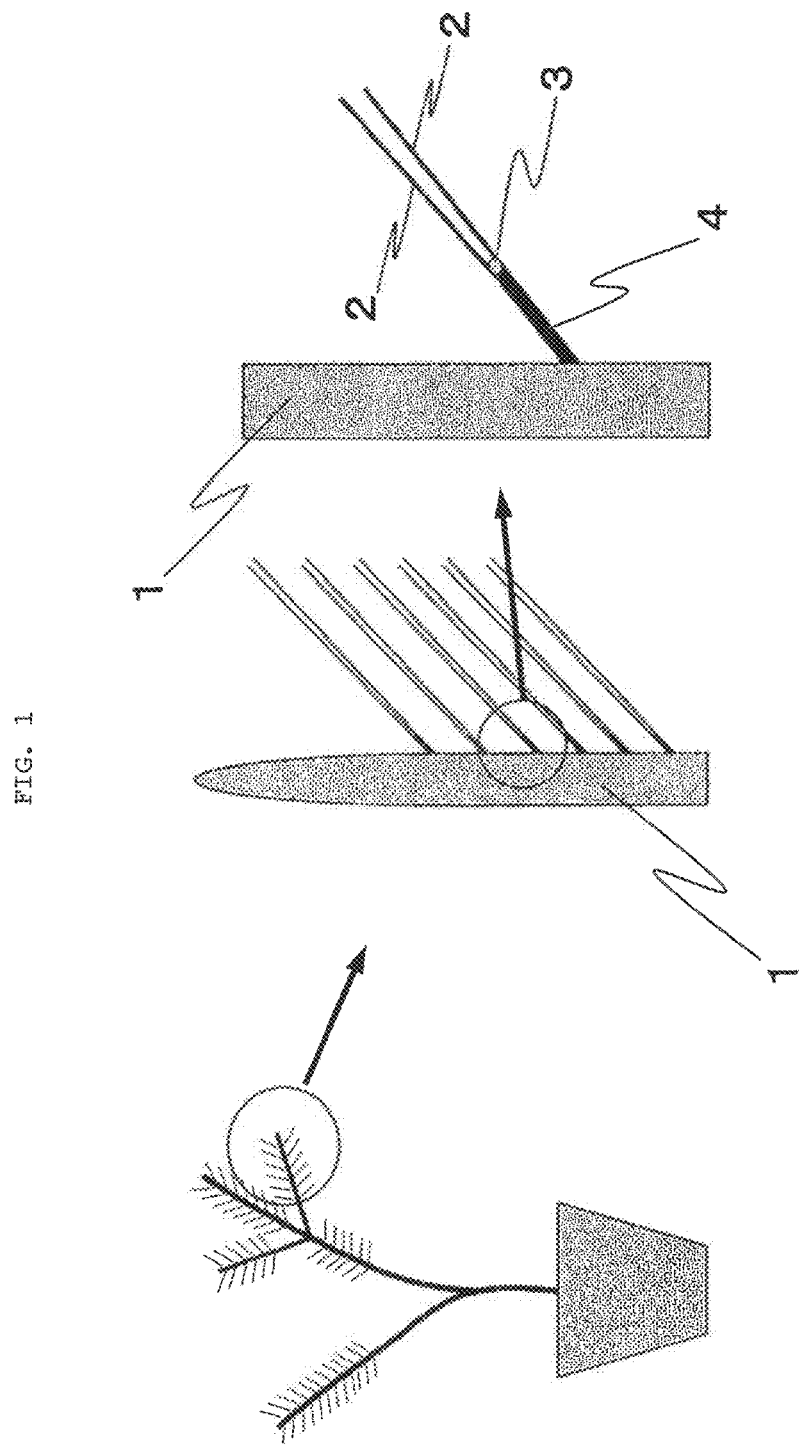
FIG. 1 is a drawing which shows the position relationship for the sites of branches and leaves in *Pinaceae* trees and names thereof.

Description of reference numerals:

1: long shoot
2: needle leaf
3: shoot apex of short shoot
4: short shoot
5: terminal bud developed from shoot apex of short shoot
6: scaly leaf or primary leaf newly differentiated and developed

BEST MODE FOR CARRYING OUT THE INVENTION

The present invention is further described below.

The present invention can be applied to *Pinaceae* trees. With regard to a mother tree from which cuttings are collected, there is no limitation for the size and the age of the tree, so long as it is in a healthy state. Although there is also no limitation for the time of collection, it is preferred for the preparation of cuttings which are more suitable for rooting by addition of the cytokinins to the outside as described later that the period from addition of the cytokinins until collection of the cuttings is almost identical with the briskly growing period of the mother tree within a year. From such a view, in the case of *Pinus densiflora* for example, the period from late autumn where the growth period is almost coming to an end to early spring which is the beginning of the growth period of the next year is not preferred as a period for collecting the cuttings.

With regard to cytokinin which is added to the outside of the shoot apex of the short shoot of the mother tree, already-known cytokinins such as zeatin, benzylaminopurine (BAP) and kinetin can be used alone or in combination of two or more thereof. Auxins such as indoleacetic acid (IAA), indolebutyric acid (IBA) and naphthaleneacetic acid (NAA) can also be added to the outside alone or in combination of two or more thereof, together with the above cytokinins.

The above-mentioned cytokinins, i.e., the cytokinins or the cytokinins and the auxins, are diluted to a predetermined concentration using an appropriate medium and added to the outside so that they are directly adhered to the shoot apex located at least at the upper end of the short shoot of the mother tree from which cuttings are collected (cf. FIG. 1). Examples of the medium for dilution include water, lipid, mineral fine powders and the like.

For example, when water is used as a medium, the above cytokinins are dissolved and can be added to the outside as an aqueous solution. When lipid is used as a medium, the above cytokinins are once dissolved in water and then uniformly suspended in lipid which is a medium using an emulsifier or a surfactant or it is not dissolved in water but the powder is uniformly suspended or mixed with lipid and the resulting suspension or a mixed liquid can be added to the outside. When powder such as mineral fine powder is used as a medium, the above cytokinins or the like are uniformly mixed with the powder and then can be added to the outside. Although the concentration of the cytokinins to the medium (when two or more solutes are used, it is a concentration calculated from the total amount of the combined cytokinins) depends on the type of the cytokinins used, it is usually preferred to be within a range of from 10 to 1,000 mg per liter of the medium or from 10 to 1,000 mg per kg of the medium. In the case of addition to the outside, other components such as a spreader can be used, if necessary, by adding to the medium together with the above cytokinins, emulsifier and surfactant.

The addition to the outside can be carried out in such a manner that, in the case of an aqueous solution or suspension where a highly fluid lipid is used as a medium, an aqueous solution or suspension in which the above cytokinins or the like are dissolved is sprayed using a sprayer or is sprinkled using a watering pot or the short shoot to be collected as cuttings is dipped in this aqueous solution or suspension. In the case of a mixed liquid where lowly fluid lipid is used as a medium, it can be carried out in such a manner that the above mixed liquid in which the cytokinins or the like are uniformly mixed is applied using an appropriate device such as a writing brush, a syringe or a grease gun. When the powder is used as a medium, it can be carried out in such a manner that the powder in which the above cytokinins or the like are uniformly mixed is applied onto the short shoot which is to be collected as a cutting.

There is no particular limitation for the frequency of the addition to outside. When the cytokinins of the above concentration are applied to the outside of a shoot apex of a short shoot of a *Pinaceae* tree with a frequency of about twice a week, the state which can be used as the cuttings of the present invention is resulted but, when the cuttings are to be collected from a mother tree which is grown outdoors, the cytokinins added outside the shoot apex of the short shoot are exposed to rain, strong wind and the like, and are flown away. Therefore, depending upon the climate conditions, frequency for the outside addition necessary for achieving the effect varies.

Figure 2:
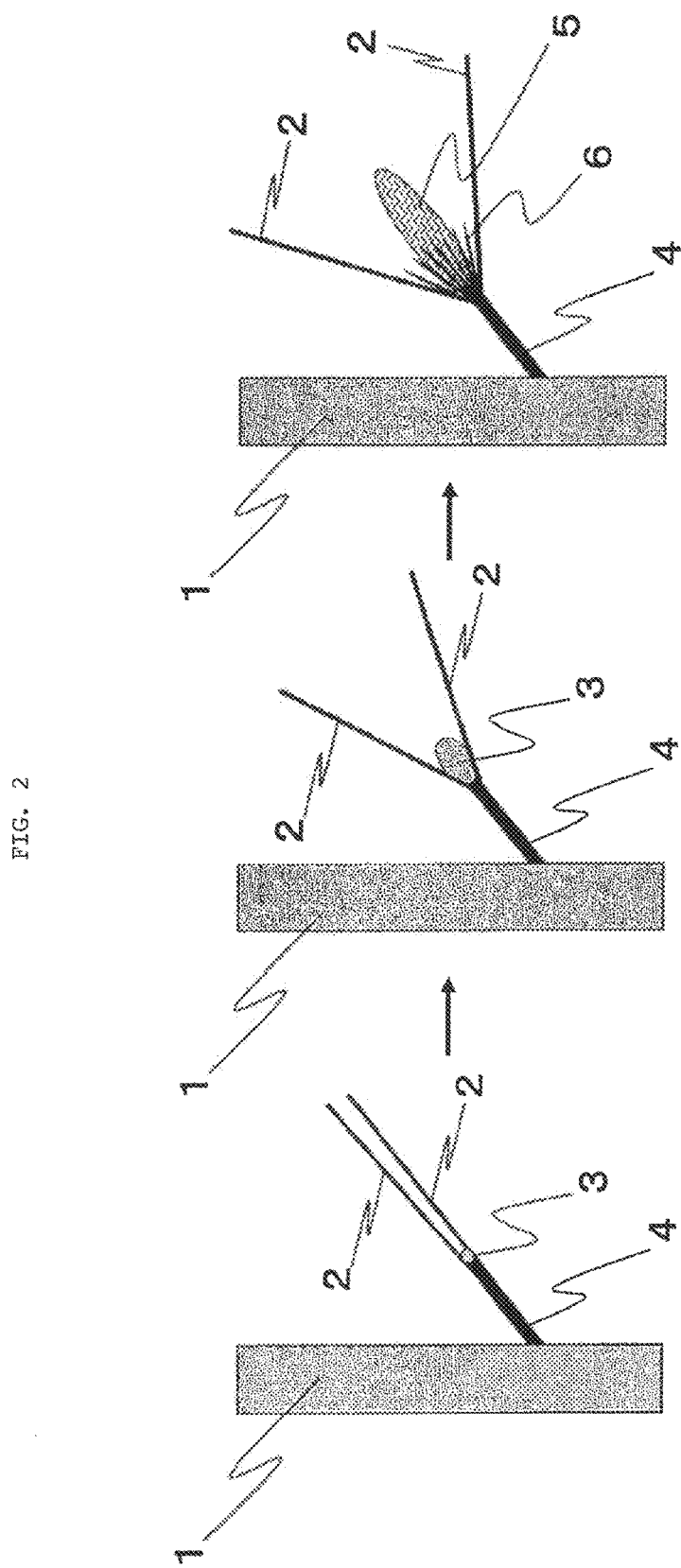
FIG. 2 is a drawing which shows changes in a shoot apex of a short shoot and surroundings thereof by addition of cytokinins to the outside thereof.

In the shoot apex of the short shoot in which the cytokinins are added to the outside as described above, dormancy is broken usually within two to three weeks from the initiation of the addition, the shoot apex gradually becomes fat to develop to terminal bud, and scaly leaf and/or primary leaf is differentiated on the base of the terminal bud or on the upper area of the short shoot (cf. FIG. 2). Accordingly, in the present invention, the short shoot where differentiation of the scaly leaf and/or primary leaf is induced as such is cut out from a long shoot at the base thereof and the cutting is photoautotrophically cultured.

At that time, it is preferred for achieving a high rooting rate by the photoautotrophically culturing to use the cutting in which the scaly leaf and/or the primary leaf in green color is grown in a length of about 2 to 10 mm and the leaf which is grown and made into a needle as such (hereinafter, it may also be referred to as a needle leaf) is developed to such an extent that it touches the adjacent needle leaf. In the cutting in such a state, the length from the base of the short shoot to the front end of the shoot apex is only about 1 cm and, as compared with the cuttings used in the conventional cutting method, it is significantly small but, in the present invention, it can be used without problems and rather achieves a high rooting rate as described above.

The cutting collected as described above is inserted into a rooting bed wetted with a liquid medium, followed by photoautotrophically culturing. More specifically, it is inserted into a rooting bed wetted with a carbon source-free liquid medium comprising nitrogen, phosphorus and potassium as essential elements, followed by culturing at a humidity of 80% or more while regulating the concentration of $CO_2$ gas in the culture vessel.

In the present invention, nitrogen, phosphorus and potassium are essential elements in the liquid medium. As the liquid medium, a commercially available composite fertilizer for domestic gardening or a publicly known liquid medium for tissue culture of plants can be used as it is or after being appropriately diluted. For example, as a composite fertilizer for domestic gardening, a solution which is prepared by diluting "Hyponex Liquid 5-10-5 (Registered Trade Mark)" (manufactured by Hyponex Japan) containing nitrogen, phosphorus and potassium as main components 250- to 500-fold while, as a liquid medium for tissue culture of plants, a solution which is prepared by diluting a Gamborg's B5 medium or a Murashige-Skoog medium (Murashige and Skoog, *Physiol. Plant.*, 15: 473 (1962); hereinafter, referred to as "MS medium") 4- to 16-fold is used as a liquid medium having a high multiplicity of use.

In addition to nitrogen, phosphorus and potassium, publicly known culture media for tissue culture of plants including the above MS medium may further contain major elements such as hydrogen, carbon, oxygen, sulfur, calcium and magnesium; minor elements such as iron, manganese, copper, zinc, molybdenum, boron and chlorine; inorganic salts; and vitamins such as thiamine, pyridoxine, nicotinic acid and the like. Accordingly, in the liquid medium of the present invention, these elements can contained as inorganic salts or vitamins, in addition to nitrogen, phosphorus and potassium.

Plant growth regulators can also be added to the liquid medium used in the present invention. For example, auxins such as IAA, IBA and NAA which promote the generation of adventitious roots from plant tissues alone or in combination of two or more thereof may be added in an amount of 0.1 to 10 mg/liter to the liquid medium of the present invention to thereby promote rooting from the cutting, that is, formation of a rooted cutting.

On the other hand, the liquid medium of the present invention is free of a carbon source such as sucrose. A carbon source is an energy source which is common to many living organisms but, in the present invention, *Pinaceae* trees grown outdoors, in a greenhouse or the like are used as mother trees and the cuttings are also conducted in such a manner that the short shoot in which a scaly leaf and/or primary leaf is induced under such non-sterile conditions is cultured at a humidity of 80% or more without any particular sterilizing operation. Accordingly, if a medium containing a carbon source is used, various bacteria adhered to the cutting or those in an incubating environment grow using a carbon source in the medium as a nutrient resulting in withering of the cutting or of a seedling formed therefrom.

As the rooting bed into which a cutting is inserted, one which can be substantially uniformly wetted with a liquid medium and can retain the inserted state when a cutting is inserted thereinto is used. For example, natural soil such as sand and *Akadamatsuchi*, artificial soil such as vermiculite, pearlite and glass beads or a porous molded product such as foamed phenol resin and rock wool is placed in a culturing vessel and it may used as a rooting bed.

Since the cutting to which nutrients such as nitrogen, phosphorus and potassium are added from the liquid medium in accordance with the present invention briskly carries out photosynthesis, it is necessary that the concentration of $CO_2$ gas therefrom is artificially regulated. Thus, since the concentration of $CO_2$ gas in the culturing vessel is decreased due to a brisk photosynthesis of the cuttings, it is necessary to artificially compensate it. In order to briskly conduct a photosynthesis for the cuttings in the culturing vessel so as to improve the rooting rate thereof, the concentration of $CO_2$ gas in the culturing vessel is preferably regulated to 300 to 1,500 ppm. When the concentration of $CO_2$ gas in the culturing vessel is lower than 300 ppm, no large improvement can be expected for photosynthetic ability and rooting rate of the cuttings while, even when the concentration of $CO_2$ gas in the culturing vessel is made higher than 1,500 ppm, photosynthetic ability and rooting rate of the cuttings do not show the enhancement corresponding to such a concentration of $CO_2$ gas. The concentration of $CO_2$ gas can be regulated for each culturing vessel but it is easier and less expensive that the concentration of $CO_2$ gas in the environment itself in which the culturing vessel is placed is regulated whereby the inside of the culturing vessel is regulated to the predetermined concentration of $CO_2$ gas. At that time, as described below, a culturing vessel where its opening is left open as it is or its opening is covered by a gas-permeable film can be used.

In the present invention, humidity in the culturing vessel can be easily adjusted to 80% or more. The reason is that, as described above, since a rooting bed wetted with a liquid medium is used, inner area of the culturing vessel is apt to become highly humid and, for example, when a wide-mouthed flask or the like where an opening is at higher position than the height of the seedling for cutting produced in this culturing vessel is used, environment in the culturing vessel is naturally held at a humidity of 80% or more during the period until healthy seedlings are formed from the cuttings. Furthermore, not only in such a container but also in containers of various shapes, the environment in the culturing vessel can be kept at a humidity of 80% or more when the size and position of an opening of the container are improved. Accordingly, in the present invention, containers of various shapes can be selected as a culturing vessel by taking the workability and the like into consideration. In view of keeping the environment in the culturing vessel at high humidity, the most preferred one is use of a tightly closed container and, even in such a case, $CO_2$ gas should be provided into the culturing vessel. For example, a method where an opening of a container is covered with a film which is permeable to $CO_2$ gas or a method where a part of or whole area of the container is prepared by a film or a sheet which is permeable to $CO_2$ gas can be adopted for such an object.

In the method for producing a rooted cutting in accordance with the present invention, there is no particular limitation for other conditions such as temperature or light intensity for incubating the cuttings. Conditions where the temperature is 20 to 30° C. and the light intensity is about 40 to 100 $\mu mol/m^2/sec$ are preferred for photosynthesis of *Pinaceae* trees. In the present invention, it is also possible to set a bright period where culturing is conducted by irradiation of light and a dark period where culturing is conducted in darkness and to carry out the culturing by repeating those bright and dark periods alternately. In that case, since photosynthesis takes place during the bright period only, $CO_2$ gas in the culturing vessel may be also regulated during the bright period only.

Furthermore, since a carbon source such as sucrose is not contained in the medium in the present invention as described above, a cutting is cultured under non-sterile conditions to thereby produce a rooted cutting. However, in order to make the production of more healthy seedlings absolutely sure, it is preferred that the culturing vessel, the liquid medium and the rooting bed are previously subjected to a treatment such as dry sterilization or autoclave sterilization prior to insertion of the cuttings.

The rooted cutting of a *Pinaceae* tree produced in the present invention can be taken out from the culturing vessel immediately after rooting, transplanted to a container for growing the seedlings and grown. With regard to the soil upon transplanting to the container for growing the seedlings and the conditions such as temperature and light intensity for the growth of the seedlings, those which are known for *Pinaceae* trees may be appropriately adopted. As a result of such a growing process, the seedlings which can be used for a predetermined object such as afforestation can be obtained.

EXAMPLES

The present invention is described below based on Examples; however, the present invention is not limited thereto.

Example 1

The whole epigeal part of 3-years-old *Pinus densiflora* obtained by natural sprouting and grown in a greenhouse was uniformly sprayed with an aqueous solution of BAP diluted to 250 mg/liter twice a week 15 times in total using a commercially available sprayer whereupon BAP was added to the outside of the shoot apex of the short shoots thereof.

After the initiation of the treatment of addition of BAP to the outside, green scaly leaves and/or primary leaves where differentiation was induced from the upper area of short shoots and the base of terminal buds grew and needle leaves developed and, therefore, the short shoots which developed to such an extent that those new needle leaves contacted each other were cut out from the base for preparing cuttings. Furthermore, the already available needles leaves (which were already present before the addition of BAP) of the short shoots were cut to about 3 cm to prepare cuttings. In the meanwhile, at this time, new needle leaves grew to the state of being usable as cuttings and the developed short leaves were 461 in total (Table 1). Thus, in accordance with the present invention, 461 cuttings at the largest can be collected from the above-mentioned *Pinus densiflora*.

On the other hand, as to an culturing vessel, holes each being with 1 cm diameter were opened in two places of the upper surface of a container made of polycarbonate having a size of 11 cm length×11 cm width×10 cm height and the openings were covered with a membrane ("Milliseal" manufactured by Nippon Millipore) which was permeable to $CO_2$ gas. As to a rooting bed, there were used fine particles of *Akadamatsuchi* which is a commonly used soil for gardening moistened with 100 ml of a Gamborg's B5 medium diluted 5-fold.

A rooted cutting was produced in such a manner that the cuttings prepared above were inserted to this rooting bed so as to make the numbers of the cuttings nine for each culturing vessel, then the concentration of $CO_2$ gas in each culturing vessel was adjusted to 1,500 ppm, followed by culturing under such conditions that the temperature was 25 to 28° C., the light intensity was 80 $\mu mol/m^2/sec$, the bright period was 16 hours and the dark period was 8 hours. The concentration of $CO_2$ gas in the culturing vessel was adjusted by adjusting the concentration of $CO_2$ gas in the environment where this culturing vessel was placed.

A rooting rate of 100 cuttings thus prepared and cultured was 33.5% (Table 1).

Comparative Example 1

Figure 3:
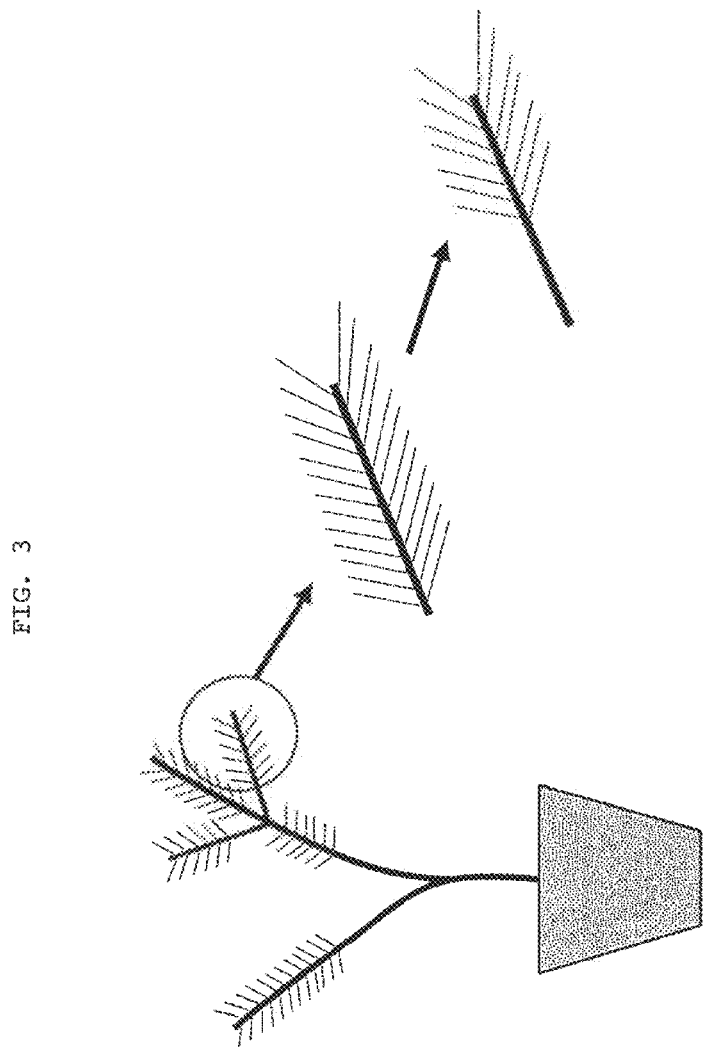
FIG. 3 is a drawing which shows a conventional method for the preparation of cuttings.

*Pinus densiflora* grown outdoors which was presumed to be 15 to 20 years old was used and cuttings were collected and prepared by a conventional method. Thus, as shown in FIG. 3, long shoots grown to the current branch of the above *Pinus densiflora* were cut out at the length of about 4 cm from the shoot apex and the product where needle leaves until the midpoint from the cut end were removed was used as a cutting. The cuttings thus prepared were cultured in the same manner as in Example 1 but, among 100 cuttings, nothing generated the root and the rooting rate was 0% (Table 1).

Comparative Example 2

The cuttings was cultured in the same manner as in Example 1, except that the concentration of $CO_2$ gas in the culturing vessel was not adjusted at all and the rooting rate of the cultured 100 cuttings was 0.6% (Table 1).

Comparative Example 3

Short shoots of 3-years-old *Pinus densiflora* obtained by natural sprouting and grown in a greenhouse were cut out from the base without addition of cytokinins and, further, needle leaves existing in those short shoots were cut shorter to about 3 cm to prepare cuttings. The cuttings thus prepared were cultured in the same manner as in Example 1 but, among 100 cuttings, nothing generated the root and the rooting rate was 0% (Table 1).

Comparative Example 4

Three-years-old *Pinus densiflora* obtained by natural sprouting and grown in a greenhouse was used and cuttings were collected and prepared by a conventional method. Thus, as shown in FIG. 3, long shoots grown to the current branch of the above *Pinus densiflora* were cut out at the length of about 4 cm from the shoot apex and the product where needle leaves until the midpoint from the cut end were removed was used as a cutting. At that time, long shoots which were grown from the current branches and used as cuttings were 21 in total (Table 1). Thus, in this example, only 21 cuttings at best can be collected from the above *P. densiflora*.

When the cuttings thus prepared was cultured in the same manner as in Example 1, the rooting rate of 100 cultured cutting was 16.7%

TABLE 1

Effect of the Invention in *P. densiflora*

| | Maximum numbers of collectable cuttings | Rooting rate (%) |
|---|---|---|
| Example 1 | 461 | 33.5 |
| Comparative Example 1 | — | 0.0 |
| Comparative Example 2 | — | 0.6 |
| Comparative Example 3 | — | 0.0 |
| Comparative Example 4 | 21 | 16.7 |

It will be apparent from Table 1 that, according to the present invention, rooting from the cuttings of *Pinaceae* trees is promoted and the rooting rate is improved as large as about twice. Moreover, when comparison was carried out between the mother trees of the same age, the cuttings which can collected according to the present invention are more than 20 times those according to the conventional method.

While the invention has been described in detail and with reference to specific embodiments thereof, it will be apparent to one skill in the art that various changes and modifications can be made therein without departing from the spirit and scope thereof.

This application is based on Japanese patent application No. 2007-155859 filed on Jun. 13, 2007, the entire contents of which are incorporated hereinto by reference. All references cited herein are incorporated in their entirety.

INDUSTRIAL APPLICABILITY

According to the present invention, a method for producing a rooted cutting which can be applied to *Pinaceae* trees which have been considered to be difficult to grow by means of cutting is provided. Also, a method for producing rooted cuttings in an amount of a practical scale in *Pinaceae* trees, that is, rooted cuttings in an amount which can be used for afforestation and tree planting at a time is provided.

The invention claimed is:

1. A method for producing a rooted cutting of a *Pinaceae* tree, comprising:
    A: adding a cytokinin to the outside of a shoot apex of a short shoot of a *Pinaceae* tree to induce a new scaly leaf and/or primary leaf which is grown to a length of 2 to 10 mm and into a form of a needle leaf to an extent that it touches an adjacent needle leaf;
    B: cutting out the short shoot in which the new scaly leaf and/or primary leaf having a length of 2 to 10 mm has been induced in A, and
    C: inserting the short shoot cutting into a rooting bed wetted with a carbon source-free liquid medium comprising nitrogen, phosphorus and potassium as essential elements, and then
    D: culturing the cutting at a humidity of 80% or more to root the cutting; wherein culturing the cutting is carried out at a $CO_2$ concentration of 300 to 1,500 ppm.

2. The method according to claim 1, wherein step A and/or step B is carried out under non-sterile conditions.

3. The method according to claim 1, wherein culturing the cutting is carried out at a temperature ranging from 20 to 30° C. and at a light intensity of 40 to 100 μmol/m²/sec.

4. The method according to claim 1, wherein the *Pinaceae* tree is a tree belonging to the genus *Pinus*.

5. The method of claim 1, wherein the *Pinaceae* tree is *Pinus densiflora*.

6. The method of claim 1, wherein the cytokinin is at least one of zeatin, benzylaminopurine (BAP) or kinetin.

7. The method of claim 1, wherein the cytokinin is benzylaminopurine (BAP).

8. The method of claim 1, wherein the cytokine further comprises an-auxin.

9. The method of claim 1, wherein the carbon-source free liquid medium further comprises one or more auxins.

10. The method of claim 1, wherein the length of the cutting from the base of the short shoot to the front end of the shoot apex is about 1 cm.

11. The method of claim 1, wherein the rooting bed is natural soil.

12. The method of claim 1, wherein the rooting bed is akadamatsuchi.

13. The method of claim 1, wherein the rooting bed comprises vermiculite, pearlite, glass beads or a porous molded product or rock wool.

14. The method of claim 1, wherein said *Pinaceae* tree is resistant to pine wilt.

15. The method of claim 1, further comprising growing a seedling from the rooted cutting.

16. The method of claim 1, further comprising growing a tree from the rooted cutting.

17. A method for mass producing *Pinaceae* seedlings or trees comprising rooting a short shoot cutting of a *Pinaceae* tree by the method of claim 1, and growing seedlings or trees from said rooted cuttings.

18. An afforestation or landscaping method comprising rooting a short shoot cutting of a *Pinaceae* tree by the method of claim 1, growing *Pinaceae* seedlings or trees, and transplanting the seedlings or trees.

* * * * *